United States Patent [19]
Fleming, Jr. et al.

[11] Patent Number: 5,861,047
[45] Date of Patent: Jan. 19, 1999

[54] METHOD FOR MANUFACTURING AN ARTICLE COMPRISING A REFRACTORY DIELECTRIC BODY

[75] Inventors: James William Fleming, Jr., Westfield, N.J.; Robert M. Pafchek, Lawrenceville, Ga.

[73] Assignee: Lucent Technologies Inc., Murray Hill, N.J.

[21] Appl. No.: 939,142

[22] Filed: Sep. 29, 1997

[51] Int. Cl.$^6$ .................................................. C03B 37/018
[52] U.S. Cl. .............................. 65/391; 134/1.1; 204/164
[58] Field of Search ............... 65/391; 204/164; 134/1.1

[56] References Cited

U.S. PATENT DOCUMENTS

| | | | |
|---|---|---|---|
| 4,746,345 | 5/1988 | Pluijms et al. | 65/391 |
| 4,761,170 | 8/1988 | Mansfield | 65/391 |
| 4,854,956 | 8/1989 | Pluijms | 65/391 |
| 4,863,501 | 9/1989 | Mansfield | 65/391 |
| 4,983,225 | 1/1991 | Gruenwald et al. | 134/1.1 |
| 5,000,771 | 3/1991 | Fleming, Jr. et al. | 65/391 |
| 5,106,402 | 4/1992 | Geittner et al. | 65/391 |
| 5,194,714 | 3/1993 | Le Sergent | 219/121.36 |
| 5,221,306 | 6/1993 | Fleming, Jr. et al. | 65/391 |
| 5,397,372 | 3/1995 | Partus et al. | 65/391 |
| 5,692,087 | 11/1997 | Partus et al. | 385/123 |

*Primary Examiner*—Peter Chin
*Assistant Examiner*—Sean Vincent
*Attorney, Agent, or Firm*—Scott J. Rittman

[57] ABSTRACT

A refractory dielectric body is heated with a plasma torch at conditions which do not result in substantial removal of a surface portion of the body, yet which are sufficient to reduce both surface and bulk impurities. Typically, the body is solid, e.g., a rod as opposed to a tube, and is treated with the plasma in the absence of simultaneous deposition of material onto the body. Advantageously, an isothermal plasma torch is utilized, and the torch advantageously produces an oxygen or oxygen-containing plasma. The invention is useful for reducing chlorine impurities by at least about 30% to a depth of at least about 10 $\mu$m, with accompanying reduction of hydroxyl impurities. The invention thus provides a useful method for reducing the concentration of impurities that contribute to imperfections during the process of drawing fiber from an optical fiber preform, without requiring substantial removal of the surface of the preform.

20 Claims, 4 Drawing Sheets

METHOD FOR MANUFACTURING AN ARTICLE COMPRISING A REFRACTORY DIELECTRIC BODY

BACKGROUND OF THE INVENTION

1. Field of the Invention

The invention relates to fabricating an article comprising a refractory dielectric body, more particularly to fabricating glass optical fiber preforms.

2. Discussion of the Related Art

As the use of optical fiber has increased, the demand for stronger, more durable fibers with improved optical properties has similarly grown. Loss mechanisms and structural faults in optical fiber typically result from imperfections and impurities existing in the glass preform from which the fiber is drawn, and much effort has gone into finding ways to reduce, remove, or eliminate these imperfections and impurities. Techniques for removing such imperfections and impurities include mechanical milling and chemical etching, neither of which is particularly desirable. Mechanical milling often introduces mechanical stresses into a preform that lead to crack formation, and chemical etching, while typically removing the intended imperfections and impurities, often introduces chemical by-products as new impurities. It is also known to use a plasma torch to remove surface impurities and imperfections, as discussed in U.S. Pat. No. 5,000,771, the disclosure of which is herein incorporated by reference. Each of these methods, however, essentially relies on removing a surface portion of the glass preform, at which the highest concentration of imperfections and impurities are normally found.

Yet, bulk impurities are also found in glass bodies. (Bulk indicates that the impurities are found throughout the glass material, e.g., both at the surface and into the interior of a body, as opposed to impurities that primarily lie within a few microns of the surface.) Typical bulk impurities in silica glass include chlorine and hydroxyl. Both types of impurities are known to induce detrimental bubbling during the drawing of fiber from silica glass preforms. Chlorine is typically introduced during fabrication of synthetic glasses from chlorine-containing compounds, e.g., from $SiCl_4$, and during a subsequent purification step of such glasses in chlorine gas. It is possible for substantial amounts of chlorine to be introduced. For example, 1000 ppm of chlorine atoms in silica glass is not uncommon. Hydroxyl groups are introduced into silica glass bodies due to the presence of water in sol-gel and other fabrication processes, and due to the common use of oxy-hydrogen torches. Even natural fused quartz glass will contain hydroxyl impurities, although such glass typically does not contain high levels of chlorine.

In some fabrication processes, it would be desirable to leave the surface of a glass body substantially intact, yet still reduce surface impurities, and advantageously bulk impurities as well. Thus, a method for fabricating an article comprising a refractory dielectric body, e.g., an optical fiber preform, is desired in which both surface and bulk impurities are reduced, with substantially no removal of the surface of the body.

SUMMARY OF THE INVENTION

It has been found to be possible to reduce impurities in a refractory dielectric body, e.g., a silica optical fiber preform, without substantial removal of a surface portion of the body. Specifically, the refractory dielectric body is treated with a plasma torch at conditions which do not result in substantial removal of a surface portion of the body, yet which are sufficient to reduce both surface impurities and bulk impurities to a depth of at least about 10 μm, particularly chlorine and hydroxyl. (Substantial removal indicates removal of more than about 0.1 mm from the surface of the body. Refractory indicates a ceramic material of relatively low thermal conductivity that is capable of withstanding temperatures of up to about 1600° C. without essential change. Dielectric indicates an electrically insulating material, i.e., a material having a resistivity of about $10^6$ ohm-cm or greater.) Typically, the body is solid, e.g., a rod as opposed to a tube. The process is optionally performed in the absence of simultaneous deposition of material onto the dielectric body, e.g., in the absence of deposition of a cladding onto a fiber core rod or of deposition of fiber core material into a cladding tube.

The process is able to achieve at least a 30% reduction in chlorine impurities to a depth of at least 10 μm, compared to the pre-plasma treated body, with an accompanying decrease in hydroxyl impurities. It is also possible to achieve a 300% or even a 3000% reduction in chlorine impurities to a depth of at least 10 μm, by modifying the process parameters, e.g., the temperature to which the dielectric body is heated. It is also possible to select the process parameters such that less than 0.1 mm of the surface of the refractory dielectric body is removed, e.g., less than about 0.05 mm, or such that no portion of the surface is removed. Advantageously, an isothermal plasma torch is utilized. More advantageously, the isothermal plasma torch uses an oxygen or oxygen-containing plasma. The plasma advantageously heats the surface of the dielectric body to a temperature of about 1800° to about 2300° C. The surface temperature attained depends on a variety of interdependent parameters, including the power supplied to the plasma torch, the type of plasma, the speed at which the plasma torch traverses the body, the speed at which the body is rotated (where cylindrical), the distance from the torch to the body, and the properties of the refractive dielectric body.

The invention is useful for reducing chlorine and hydroxyl impurities from silica optical fiber preforms. The invention thus provides a method for reducing surface and bulk impurities that contribute to imperfections during the process of drawing fiber from an optical fiber preform, without requiring substantial removal of the surface of the preform. Production of tougher fiber exhibiting desirable properties is thereby possible.

DETAILED DESCRIPTION OF THE INVENTION

According to the invention, a refractory dielectric body, e.g., a silica glass optical fiber preform or a planar waveguide, is heated with a plasma torch to reduce surface and bulk impurities, to a depth of at least about 10 µm. It is expected that a variety of impurities, in addition to chlorine and hydroxyl, will be reduced by the process of the invention. It is possible to use the process of the invention for refractory dielectric bodies of various shapes. Typically, the body will be solid, e.g., a rod as opposed to a tube. Optionally, the process is performed in the absence of simultaneous deposition of material onto the dielectric body, e.g., in the absence of deposition of cladding material onto a fiber core rod or of deposition of fiber core material into a cladding tube.

Advantageously, an isothermal plasma torch is used, isothermal indicating that the ion temperature and electron temperature are substantially the same in the plasma. The plasma of an isothermal plasma torch typically contains electrically conducting regions with a center region in which the plasma temperature is the highest. A plasma fireball is defined as the region containing the electrically conducting portion of the plasma, into which the plasma-sustaining electromagnetic energy is coupled. Any chlorine-free isothermal plasma capable of substantial ultraviolet (UV) emissions is expected to be useful. Examples include oxygen and oxygen-containing plasma, e.g., oxygen/argon. While not limiting the invention to any theory, it is believed that reduction of impurities is attained by the thermal effects of the plasma in combination with the UV radiation generated by the plasma. It is possible that the UV radiation affects impurities such as chlorine and/or hydrogen/hydroxyl within the refractory dielectric body, allowing the impurities to diffuse out of the body.

Figure 1:
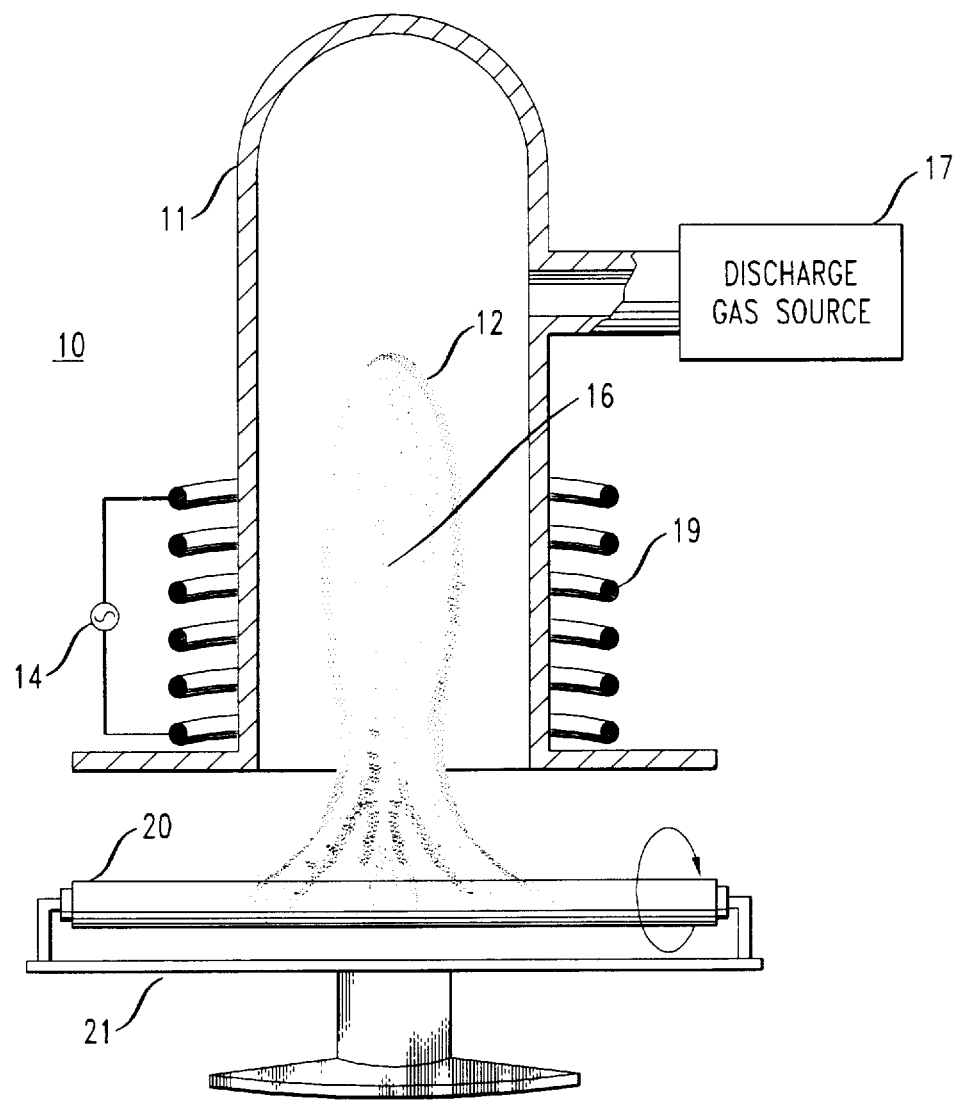
FIG. 1 shows an isothermal plasma torch useful for the process of the invention.

An example of an isothermal plasma torch 10 useful in the invention is presented in FIG. 1. The torch 10 contains a fused silica mantle 11 connected to a gas source 17. The gas source 17 delivers the gas used for the plasma discharge into the mantle 11, and the plasma fireball 12 is excited by a RF coil 19 and RF generator 14. The fireball 12 is typically contained primarily within the torch, with the center 16 of the fireball 12 typically located approximately at the middle of the RF coil 19. As reflected in FIG. 1, where the refractory dielectric body 20 is cylindrical, e.g., an optical fiber preform, the body is typically mounted to a lathe 21, which is capable of rotating the body 20 during treatment. The torch 10 is typically mounted such that it is capable of being vertically adjusted and tilted to allow a desired arrangement of the fireball 12 with respect to the body 20. Torch 10 is typically capable of lateral movement in order to traverse the body 20. It is also possible for the lathe 21 to provide such lateral movement. In addition, as discussed in U.S. Pat. No. 5,000,771, it is possible to configure a torch such that the fireball is pushed further outside the mantle. It is typically unnecessary to use such a configuration in the invention because pushing the fireball outside the mantle generally results in faster removal of the body being treated, an effect inconsistent with the advantages of the invention.

The refractory dielectric body is heated with the plasma torch such that impurities such as chlorine and hydroxyl are reduced, yet the surface portion of the body is not substantially removed (i.e., not more than about 0.1 mm is removed from the surface of the body). The process is effective in reducing chlorine impurities at least about 30% to a depth of at least about 10 µm, with an accompanying reduction in hydroxyl impurities, compared to the pre-plasma treated body. It is also possible to reduce the chlorine impurities at least about 300% or at least about 3000%, to a depth of at least about 10 µm, depending on the particular process parameters. (As discussed herein, when comparing the impurity level, at a given depth D, of an untreated body to a plasma-treated body, any surface material removed by the plasma treatment is not considered. In other words, in the plasma-treated body, the level of impurities is measured at depth D from the new surface of the treated body—the amount of material removed from original surface is not taken into account to modify D.)

An important factor in attaining impurity reduction without substantial surface removal appears to be the temperature to which the surface of the refractory dielectric body is heated by the plasma torch. This surface temperature is affected by a combination of variables, including the type of plasma (e.g., higher ionizing gases, which require more power to free up electrons, have higher energy transfer to a body, and gases also have varying thermal conductivities), the power supplied to the plasma torch, the translational speed of the torch with respect to the body, the rotational speed (if any) of the body, and the separation between the fireball and the surface of the body. (The separation between the fireball and surface of the body is defined as the shortest distance from the center of the fireball to the surface of the body.) These variables are inter-related. For example, a slow translational speed and large separation will typically have an effect similar to a faster translational speed and a smaller separation. The surface temperature is also affected by the properties of the refractory dielectric body, e.g., the body's thermal capacity, thermal conductivity, emissivity, and heat of vaporization.

For a silica glass body, the surface of the body is advantageously heated to a temperature of about 1800° to about 2300° C. during the plasma treatment, more advantageously about 1900° to about 2100° C. Temperatures lower than 1800° C. generally result in too low a level of impurity removal, while temperatures about 2300° C. generally result in too much surface removal. (As used herein, surface temperature indicates the temperature of the body surface at the area just exiting the plasma fireball. The surface temperature is measured, for example, by aiming an infrared pyrometer at the area of the body just exiting the fireball, where the pyrometer is set at a wavelength of about 4 to about 5 µm and an emissivity of about 0.9.) This temperature range is achieved by a combination of the process variables mentioned above. Specifically, a useful range for plasma torch power (i.e., RF generator power) is about 20 to about 60 kW (typically at about 3 MHz). Useful traverse rates for the torch with respect to the body range from about 0.1 to about 100 cm/min, advantageously about 1 to about 10 cm/min. The traverse rate is attained by moving the torch, the body, or both the torch and the body. A useful range for body rotation (for cylindrical bodies) is about 20 to about 100 revolutions per minute (rpm). A useful separation distance between the center of the fireball and the surface of the body is about 3 to about 10 cm. The separation distance will vary depending in part on the overall size of the fireball, which in turn varies based largely on the torch power. Specifically, as the power into the fireball lead is increased, a larger volume of gas is ionized at any given instant, thereby increasing the length and diameter of the fireball. Gas flow into the plasma torch is typically about 1 to about 100 liters/min. A control sample is easily used to determine the precise parameters for a given set of conditions that will yield a desired temperature treatment.

The invention will be further clarified by the following examples, which are intended to be purely exemplary.

Comparative Example 1

Figure 2:
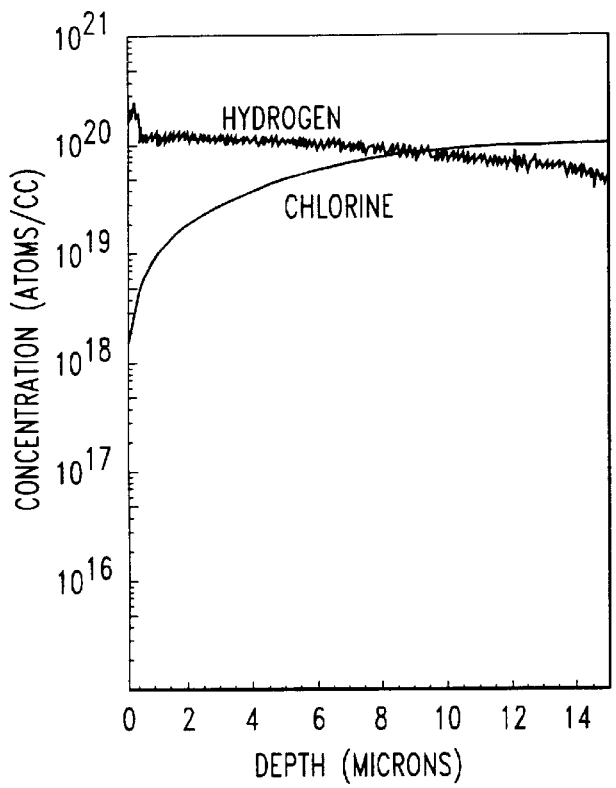
FIG. 2 shows an impurity concentration profile indicating the effects of the process of the invention.
Figure 3:
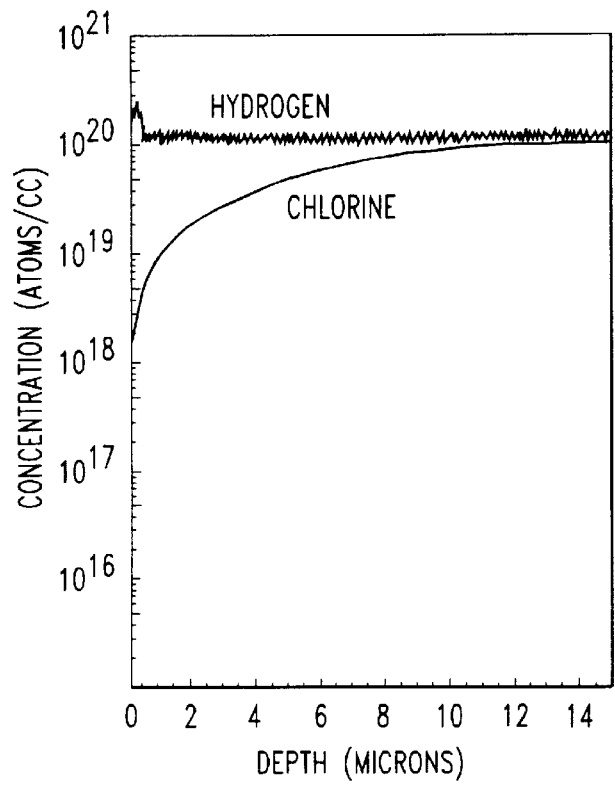
FIG. 3 shows an impurity concentration profile indicating the effects of the process of the invention.

An amorphous silica glass rod, nominally 5 cm in diameter, was made by a process that incorporated chlorine and hydroxyl impurities. FIG. 2 shows the concentration profile for chlorine and hydrogen impurities from the surface of the rod toward its interior. The profile was measured by SIMS (secondary ion mass spectroscopy). The glass was then treated with an oxy-hydrogen torch. The torch traversed the surface of the rod at about 1 to 1.5 cm/min while the rod was rotated at about 45 rpm. The torch heated the surface to greater than 1850° C., as measured by aiming an infrared pyrometer at the area of the body just exiting the fireball, the pyrometer set at a wavelength of about 4 to about 5 µm and an emissivity of about 0.9. This temperature was sufficient to vaporize some silica from the surface of the rod. FIG. 3 is the concentration profile after treatment with the torch, measured in the same manner. (The surface, i.e., zero, point in FIG. 3 is the new surface of the torch-treated rod, not the surface point of FIG. 2.) FIG. 3 shows that the treatment appears to have slightly reduced the chlorine concentration, although the reduction is within the margin of error for SIMS. As expected with use of an oxy-hydrogen torch, the hydrogen level was not lowered by the treatment.

EXAMPLE 1

Figure 4:
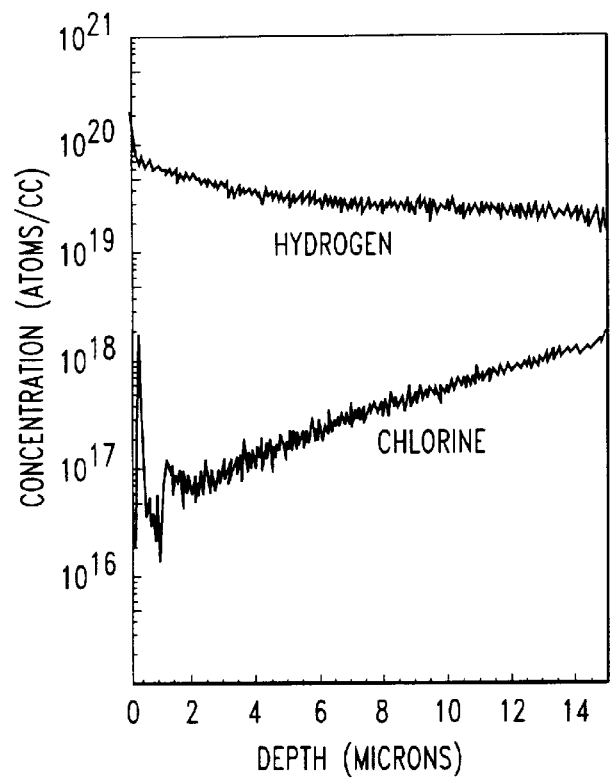
FIG. 4 shows an impurity concentration profile indicating the effects of the process of the invention.

The same rod used in Comparative Example 1 was mounted in a glass working lathe to which a plasma torch was attached. The diameter of the rod was measured to an accuracy of 0.001 mm with a laser micrometer. The plasma torch was stabilized to run an oxygen plasma, and the power to the plasma was about 40 kW at 3 MHz. The plasma flame was positioned such that the fireball would impinge the surface of the glass rod, with the center of the fireball positioned about 5 to about 6 cm from the rod's surface. The surface temperature in the plasma heated region was measured with an infrared pyrometer. The plasma was traversed (over a portion treated by the oxy-hydrogen torch in Comparative Example 1) for an axial length of 50 cm at a traverse rate of 4.0 cm/min while the rod was rotated at about 45 rpm. The vaporization of the rod was discerned in real time by the extent of redeposited silica on the rod surface near the hot zone, and less surface vaporization occurred than in Comparative Example 1. The pyrometer indicated that the plasma heated the rod's surface to a temperature of 2020° C., measured in the same manner as above. After the plasma treatment, the micrometer indicated that about 0.02 mm of silica had been removed from the rod surface. The SIMS concentration profile after the plasma treatment is presented in FIG. 4, which shows that the treatment was effective in reducing chlorine and hydrogen impurities. (The surface, i.e., zero, point in FIG. 4 is the new surface of the plasma-treated rod, not the surface point of FIG. 3.)

EXAMPLE 2

Figure 5:
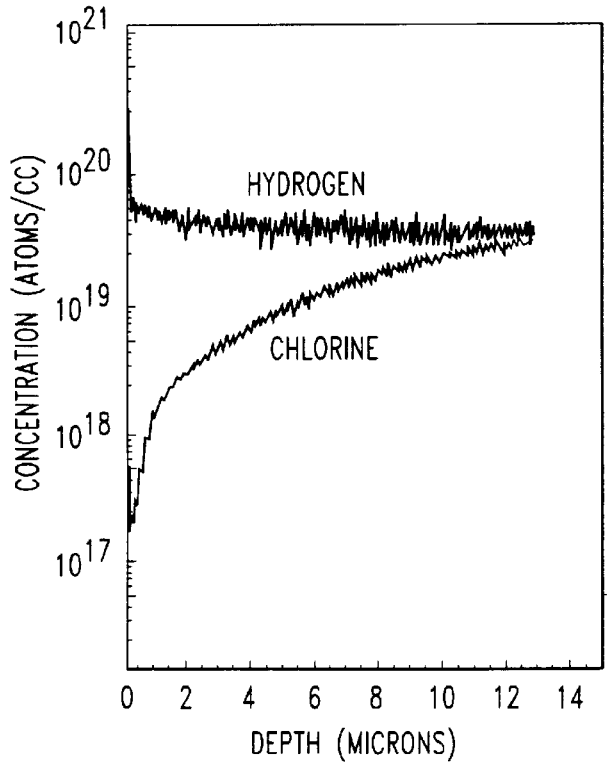
FIG. 5 shows an impurity concentration profile indicating the effects of the process of the invention.

This Example utilized a separate portion of the same oxy-hydrogen treated rod used in Example 1. The oxygen plasma torch of Example 1 was traversed at a rate of 8 cm/min, with the same power, separation, and rotation rate as in Example 1. Two passes were performed at this traverse rate, duplicating the surface exposure time of Example 1. However, the rod's surface temperature, measured in the same manner as above, did not exceed 1800° C., and the micrometer indicated that no removal of silica had occurred. The concentration profile after the treatment is shown in FIG. 5. While the higher temperature treatment of Example 1 was more effective in removing impurities, FIG. 5 shows that significant reduction in impurities is possible without removal of silica from a rod's surface. (The surface, i.e., zero, point in FIG. 5 is the same as prior to treatment, e.g., the same as the surface point of FIG. 3.)

EXAMPLE 3

Figure 6:
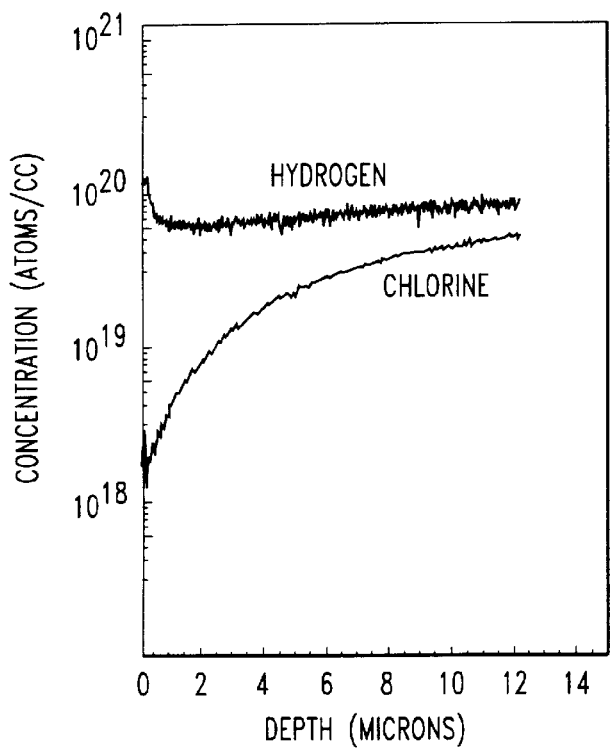
FIG. 6 shows an impurity concentration profile indicating the effects of the process of the invention.
Figure 7:
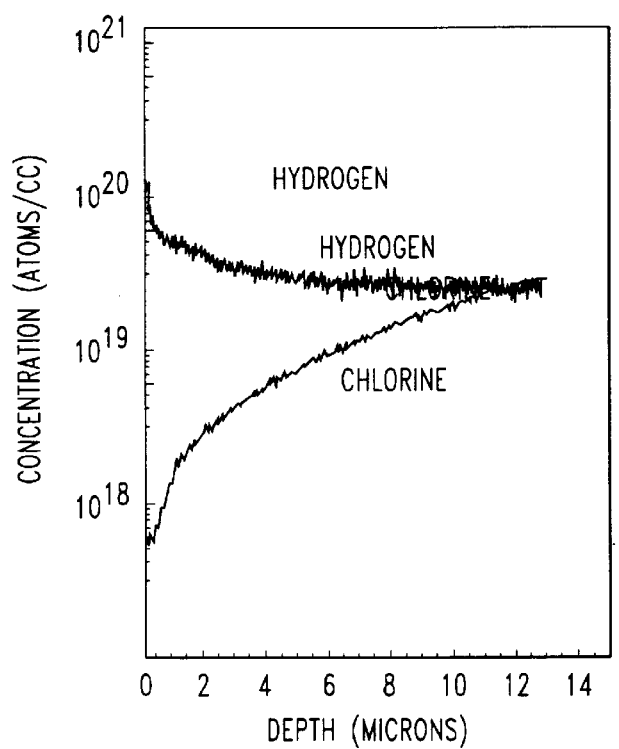
FIG. 7 shows an impurity concentration profile indicating the effects of the process of the invention.

The same type and size rod as in the above examples was treated with the same oxygen plasma torch. The traverse rate, power, separation, and rotation rate were the same as in Example 2, except that only a single traverse was performed, thereby decreasing by about half the exposure time. The surface temperature of the rod, measured in the same manner as above, was about 1900° C. The post-treatment laser micrometer measurements indicated a surface loss of about 0.01 mm. FIG. 6 shows the chlorine and hydrogen concentration profile before the plasma treatment, and FIG. 7 shows the profile after the treatment. (The surface, i.e., zero, point in FIG. 7 is the new surface of the treated rod.) The treatment provided significant reduction of bulk chlorine and hydrogen impurities.

The trends shown in FIGS. 5, 6, and 7 suggest that the reduction of chlorine and hydroxyl impurities continues into the silica rod, well past the measurement end point of 15 µm.

EXAMPLE 4

A rod of the same type and size as the above examples was treated with the same oxy-hydrogen torch of Comparative Example 1. Then, the entire rod was placed in an optical fiber draw furnace, and a process of drawing 125 µm diameter fiber was begun in which a chlorine- and hydroxyl-containing surface would typically react by forming blisters. Upon visual examination of the rod, blisters were clearly evident. The rod was then removed and further treated with an oxygen plasma torch using the same traverse rate, power, separation, and rotation rate as Example 3 (with a single traverse). The rod was then placed in the same draw furnace, and the process of drawing fiber begun. No blisters were evident upon visual examination.

Other embodiments of the invention will be apparent to those skilled in the art from consideration of the specification and practice of the invention disclosed herein.

What is claimed is:

1. A method for fabricating an article comprising a refractory dielectric body, comprising the steps of:

providing a refractory dielectric body; and heating the refractory dielectric body with a plasma torch without substantial removal of a surface portion of the body, wherein the heating reduces impurities in the body, such that chlorine impurities are reduced at least 30% to a depth of at least about 10 µm.

2. The method of claim 1, wherein the reduced impurities further comprise hydroxyl impurities.

3. The method of claim 1, wherein the body is solid.

4. The method of claim 1, wherein the body is a rod.

5. The method of claim 1, wherein the body is heated with the plasma torch in the absence of simultaneous deposition of material onto the body.

6. The method of claim 1, wherein the plasma torch is an isothermal plasma torch.

7. The method of claim 6, wherein the plasma comprises oxygen.

8. The method of claim 7, wherein the plasma is selected from pure oxygen and a mixture of oxygen and argon.

9. The method of claim 1, wherein the portion of the body heated by the plasma is heated to a surface temperature of about 1800° to about 2300° C.

10. The method of claim 7, wherein the plasma torch has a power of about 20 to about 60 kW.

11. The method of claim 1, wherein during the heating step the separation between the center of a fireball produced by the plasma torch and the surface of the body is about 1 to about 10 cm.

12. The method of claim 1, wherein the heating step is performed at a traverse rate of about 0.1 to about 100 cm/min.

13. The method of claim 12, wherein the traverse rate is about 1 to about 10 cm/min.

14. The method of claim 12, wherein the body is cylindrical and is rotated at a rate of about 20 to about 100 rpm.

15. The method of claim 1, wherein less than 0.05 mm of the surface portion of the body is removed by the heating step.

16. The method of claim 1, wherein removal of the surface portion of the body is avoided during the heating step.

17. The method of claim 1, wherein chlorine impurities are reduced at least 300% to a depth of at least about 10 $\mu$m.

18. The method of claim 17, wherein chlorine impurities are reduced at least 3000% to a depth of at least about 10 $\mu$m.

19. The method of claim 1, wherein the refractory dielectric body comprises silica glass.

20. The method of claim 19, wherein the refractory dielectric body is an optical fiber preform.

* * * * *